United States Patent
Brandt et al.

(10) Patent No.: US 10,140,217 B1
(45) Date of Patent: Nov. 27, 2018

(54) LINK CONSISTENCY IN A HIERARCHICAL TLB WITH CONCURRENT TABLE WALKS

(71) Applicant: International Business Machines Corporation, Armonk, NY (US)

(72) Inventors: Uwe Brandt, Stuttgart (DE); Frank S. Lehnert, Weil im Schoenbuch (DE); Thomas G. Koehler, Holzgerlingen (DE); Markus M. Helms, Boeblingen (DE); Martin Recktenwald, Schoenaich (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/844,564

(22) Filed: Dec. 17, 2017

Related U.S. Application Data (63) Continuation of application No. 15/648,884, filed on Jul. 13, 2017.

(51) Int. Cl.
*G06F 12/1027* (2016.01)
*G06F 12/128* (2016.01)
(Continued)

(52) U.S. Cl.
CPC ...... *G06F 12/1027* (2013.01); *G06F 12/1009* (2013.01); *G06F 12/122* (2013.01);
(Continued)

(58) Field of Classification Search
CPC ............ G06F 12/1027; G06F 12/1009; G06F 12/122; G06F 12/128
(Continued)

(56) References Cited

U.S. PATENT DOCUMENTS

| 6,418,522 B1 * | 7/2002 | Gaertner | G06F 12/1027 |
| | | | 711/207 |
| 6,553,477 B1 * | 4/2003 | Krishna | G06F 12/1027 |
| | | | 700/200 |

(Continued)

OTHER PUBLICATIONS

Brandt et al., "Link Consistency in a Hierarchical TLB With Concurrent Table Walks", U.S. Appl. No. 15/855,280, filed Dec. 27, 2017, 22 pages.
(Continued)

*Primary Examiner* — Harry W Byrne
(74) *Attorney, Agent, or Firm* — Alexander G. Jochym (57) ABSTRACT

The present disclosure relates to a method of operating a hierarchical translation lookaside buffer (TLB). The TLB comprises at least two TLB levels, wherein a given entry of the upper level TLB comprises a portion of bits for indicating related entries in the lower level TLB. The method comprises the following when a TLB miss is encountered for a requested first virtual address. A first table walk is performed to obtain the absolute memory address for the first virtual address. A logical tag is stored. The logical tag comprises the portion of bits that has been identified in association with the first table walk. In response to determining that a concurrent second table walk, of the ongoing first table walk, that has a second virtual address that addresses the same entry in the upper level TLB as the first virtual address is writing in the TLB, the stored logical tag may be incremented. And, the incremented logical tag and the obtained absolute memory address may be stored in the TLB.

12 Claims, 3 Drawing Sheets

(51) Int. Cl.
*G06F 12/1009* (2016.01)
*G06F 12/122* (2016.01)

(52) U.S. Cl.
CPC ...... *G06F 12/128* (2013.01); *G06F 2212/621* (2013.01); *G06F 2212/65* (2013.01); *G06F 2212/68* (2013.01)

(58) Field of Classification Search
USPC ..... 365/49.1, 49.11, 78, 148, 158, 171, 173, 365/48, 66, 80–85, 100, 225.5, 243.5
See application file for complete search history.

(56) References Cited

U.S. PATENT DOCUMENTS

| | | | | |
|---|---|---|---|---|
| 6,560,688 | B1* | 5/2003 | Strongin | G06F 12/1027 345/568 |
| 7,426,626 | B2* | 9/2008 | Augsburg | G06F 12/1027 711/125 |
| 7,721,067 | B2* | 5/2010 | Kopec | G06F 12/1027 711/202 |
| 8,151,085 | B2* | 4/2012 | Deutschle | G06F 12/0888 711/118 |
| 8,762,684 | B2 | 6/2014 | Adams et al. | |
| 9,069,690 | B2 | 6/2015 | Hildesheim et al. | |
| 9,183,161 | B2 | 11/2015 | Hildesheim et al. | |
| 9,405,703 | B2 | 8/2016 | Loh | |
| 2007/0050594 | A1* | 3/2007 | Augsburg | G06F 12/1027 711/207 |
| 2007/0061549 | A1 | 3/2007 | Kaniyur et al. | |
| 2007/0094476 | A1* | 4/2007 | Augsburg | G06F 12/1027 711/207 |
| 2007/0174584 | A1* | 7/2007 | Kopec | G06F 9/3861 711/207 |
| 2009/0187731 | A1* | 7/2009 | Deutschle | G06F 12/0888 711/207 |
| 2013/0326143 | A1 | 12/2013 | Chen | |

OTHER PUBLICATIONS

IBM, Appendix P, list of patents or patent applications treated as related, filed herewith, 2 pages.
Barr, Thomas W., "Exploiting Address Space Contiguity to Accelerate TLB Miss Handling", Thesis, Rice University, Houston, Texas, Apr. 2010, 105 pages.
Bhargava et al., "Accelerating Two-Dimensional Page Walks for Virtualized Systems", ASPLOS'08 Mar. 1-5, 2008, Seattle, Washington, USA, Copyright © 2008 ACM978-1-59593-958-6/08/03, 10 pages.
Pham et al., "CoLT: Coalesced Large-Reach TLBs", 2012 IEEE/ACM 45th International Symposium on Microarchitecture, © 2012 IEEE DOI 10.1109/MICRO.2012.32, 12 pages.
Brandt et al., "Link Consistency in a Hierarchical TLB With Concurrent Table Walks", U.S. Appl. No. 15/648,884, filed Jul. 13, 2017, 28 pages.

* cited by examiner

LINK CONSISTENCY IN A HIERARCHICAL TLB WITH CONCURRENT TABLE WALKS

BACKGROUND

The present invention relates generally to the field of digital computer systems, and more specifically, to a method for operating a hierarchical translation lookaside buffer.

Recent microprocessor architecture allows software to use "virtual" (or sometimes called "logical") addresses to reference memory locations. The memory access itself is done using a "physical" (or sometimes called "absolute") address. To translate between the two, typically a data structure called Translation Lookaside Buffer (TLB) is involved. The process of translating is sometimes called Dynamic Address Translation (DAT), in particular in the IBM z/Architecture.

Entries in a hierarchical TLB are linked via tags. In the hierarchical TLB, entries have a 1:n relationship, e.g. a higher level entry can point to n lower lever entries (for instance a 1M segment can have 2048 4 k pages). However, when new entries are created it has to be ensured in an efficient manner that the links between higher and lower level remain consistent.

SUMMARY

According to an embodiment of the present invention, A method of operating a hierarchical translation lookaside buffer (TLB) when a TLB miss is encountered for a requested first virtual address, the TLB comprising at least two TLB levels, wherein a given entry of the upper level TLB comprises a portion of bits for indicating related entries in the lower level TLB, the method comprising: performing a first table walk to obtain the absolute memory address of the first virtual address; storing in association with the first table walk, as a logical tag, the portion of bits of an entry to be replaced of the upper level TLB; responsive to determining that a second table walk, concurrent with the first table walk, having a second virtual address that addresses the same entry in the upper level TLB as the first virtual address is writing in the TLB, incrementing the stored logical tag; and storing the incremented logical tag and the obtained absolute memory address in the TLB.

According to another embodiment of the present invention, An apparatus for operating a hierarchical translation lookaside buffer (TLB), the TLB comprising at least two TLB levels, wherein a given entry of the upper level TLB comprises a portion of bits for indicating related entries in the lower level TLB, the apparatus configured for performing the following when a TLB miss is encountered for a requested first virtual address: performing a first table walk to obtain the absolute memory address for the first virtual address; storing in association with the first table walk, as a logical tag, the portion of bits of an entry to be replaced of the upper level TLB; in response to determining that a concurrent second table walk, of the ongoing first table walk, that has a second virtual address that addresses the same entry in the upper level TLB as the first virtual address is writing in the TLB, incrementing the stored logical tag; storing the incremented logical tag and the obtained absolute memory address in the TLB.

According to another embodiment of the present invention, A computer program product for operating a hierarchical translation lookaside buffer (TLB) when a TLB miss is encountered for a requested first virtual address, the TLB comprising at least two TLB levels, wherein a given entry of the upper level TLB comprises a portion of bits for indicating related entries in the lower level TLB, the computer program product comprising: one or more computer readable storage media and program instructions stored on the one or more computer readable storage media, the program instructions comprising: program instructions to, perform a first table walk to obtain the absolute memory address of the first virtual address; program instructions to, store in association with the first table walk, as a logical tag, the portion of bits of an entry to be replaced of the upper level TLB; program instructions to, responsive to determining that a second table walk, concurrent with the first table walk, having a second virtual address that addresses the same entry in the upper level TLB as the first virtual address is writing in the TLB, incrementing the stored logical tag; and program instructions to, store the incremented logical tag and the obtained absolute memory address in the TLB.

BRIEF DESCRIPTION OF THE SEVERAL VIEWS OF THE DRAWINGS

In the following embodiments of the invention are explained in greater detail, by way of example only, making reference to the drawings in which.

DETAILED DESCRIPTION

The descriptions of the various embodiments of the present invention are presented for the purpose of illustration, but are not intended to be exhaustive or limited to the embodiments disclosed. Many modifications and variations will be apparent to those of ordinary skill in the art without departing from the scope and spirit of the described embodiments. The terminology used herein is chosen to best explain the principles of the embodiments, the practical application or technical improvement over technologies found in the marketplace or to enable others of ordinary skill in the art to understand.

The TLB is a set-associative TLB. For example, the upper level TLB is a n-associative TLB and the lower level TLB is a m-associative TLB. For example, n is smaller than m. In one example, the apparatus that comprises the hierarchical TLB may further comprise a first one buffer TLB (TLB1), wherein the hierarchical TLB is the second TLB (TLB2). The hierarchical TLB is arranged to feed TLB1 with address information in case of a missing address of the TLB1. For example, each of the level TLBs of hierarchical TLB (TLB2) can be provided with LRU-information.

Page translation, i.e., translation of the virtual page address to the physical page address, is accomplished by a page table walk. The operating system maintains tables that contain information for translating the virtual page address to a physical page address. These tables reside in system memory. Hence, it is a relatively costly operation to perform a page table walk. The page table walk may be performed by hardware, software or a combination thereof. For example, the first and second table walks refer or write to the same upper level TLB entry but on different lower level entries.

The present method has the advantage of ensuring that when new entries are created in the TLB, verifying the links between higher and lower levels remain consistent is performed in an efficient manner. The present method may require only 2 TLB access cycles and thus improves overall translation latency and power consumption. The present method may also support concurrent table walks thus reducing wait time.

In one example, when a TLB—miss is encountered, the LRU and tag values are remembered and a table walk is started. When the table walk completes with an absolute address the LRU value which was obtained during the lookup is used to select the set of the TLB and the tag is incremented if a new entry is created on the higher level. Concurrent table walks are supported by observing TLB write accesses. If a write access occurs on the same congruence class of the TLB, the tag of the running table walk is incremented.

For example, incrementing the stored logical tag of the first table walk is performed in case the second table walk is writing its results in the TLB. If for example, the first and second table walks are the very first table walks in the system (e.g. starting from scratch) then they both refer to the same entry with the portion of bits X and have the same entry to be replaced (e.g. same LRU entry). The second table walk may be the first one to write in the TLB and at the time of writing in the TLB the second table walk will increment the logical tag (e.g. to become X+1) associated with it and thereafter write in the TLB in the entry to be replaced. At the time of writing by the second table walk it may be determined that the first table walk is the concurrent one (which has not yet written in the TLB), and thus the logical tag of the first table walk may be incremented (e.g. to become X+1) at this time and at the time of writing the results of the first table walk in the TLB the incremented logical tag may be incremented again (e.g. to become X+2) before writing into the TLB. In this way the incremented logical tag X+1 of the second table walk is different from the incremented logical tag X+2 of the first table walk. Accordingly, both incremented logical tags, X+1 of the second table walk and X+2 of the first table walk, are different than the logical tag X that has been determined to be the tag of the entry to be replaced.

According to one embodiment, the method further comprises determining a least recently used (LRU) entry in the upper level TLB as the entry to be replaced and a LRU entry in the lower level TLB, wherein storing the logical tag further comprises storing an indication of the two LRUs in association with the first table walk. This can prevent deleting relevant entries and thus can increase the TLB hit rate.

For example, the LRU entries are determined at the beginning of the table walk and the fact that it might change while the table walk is running can be omitted (e.g. there could be a TLB hit during that time which alters the LRU and we would miss that LRU update). However, that is a small downside as it rarely happens. With the present method it is more important to keep the TLB available for lookups rather than blocking for LRU read-out.

According to one embodiment, the LRU entry and the logical tag are determined during access of the TLB and results in detecting the TLB miss before performing the first table walk. This can further improve the overall translation latency as the LRU and the logical tag can be determined in the same cycle that the TLB miss is detected. For example, the process for handling the TLB miss can comprise two TLB access cycles, one cycle for TLB miss, tag and LRU read and another cycle for the write of the absolute address. An LRU entry is also determined for the second table walk, wherein the LRU entry of the second table walk is the same as the LRU entry of the first table walk.

According to one embodiment, the method further comprises: detecting a TLB miss for the second virtual address; storing the logical tag in association with the second table walk; performing the second table walk; incrementing the stored logical tag of the second table walk such that that resulting tag is different from the incremented logical tag of the first virtual address; and storing the incremented logical tag of the second table walk and the obtained absolute memory address of the second virtual address in the TLB. For example, the storing of the incremented logical tag of the first table walk can comprise incrementing the incremented tag and storing the further incremented tag and the obtained absolute memory address in the TLB, wherein, the incrementing of the logical tag of the second table walk is performed as the further incrementing of the logical tag of the first table walk. This can ensure that overlapping requests (of the first and second virtual addresses) on the same entry use a different tag when the result is written.

According to one embodiment, the method further comprises: detecting a TLB miss for a third virtual address that addresses the same entry in the upper level TLB as the first virtual address; storing the logical tag in association with a third table walk; wherein the increment of the logical tag of the first table walk further comprises incrementing the logical tag of the third table walk in case the third table walk is concurrent to the second table walk; wherein the storing of the incremented logical tag and the obtained absolute memory address in the TLB further comprises: in response to determining that the third table walk is concurrent to the first table walk at the time of the storing further incrementing the logical tag of the third table walk. This can provide an iterative approach. The present method can ensure that concurrent table walks addressing the same entry in the upper level TLB don't use the same tag. For example, if they write to the same upper level TLB entry (e.g. CRSTE entry) but different lower level entries (e.g. PTE entries) the present method can ensure that the tag of the translation that wrote first is lower than the tag from the translation that wrote second.

According to one embodiment, the third table walk ends after the first table walk and the first table walk ends after the second table walk. In another example, the order in which the first and second table walks ends may not be relevant as long as they are concurrent table walks. Concurrent table walks refer to table walks that run in parallel during at least part of the lifetime of one of the table walks.

According to one embodiment, the method further comprises: providing a first array having an element per ongoing table walk; storing in each element of the first array data indicative of the entry of the upper level TLB that is addressed by a virtual address of the table walk of the element; wherein the data comprises at least the logical tag for the first table walk; providing a circuit logic for performing the determining and the incrementing step using values stored in the elements of the first array; wherein the circuit logic is configured to store the incremented tag on an element of the first array associated with the first table walk. This can provide an optimal hardware implementation of the present method that can seamlessly be integrated in existing processing units.

According to one embodiment, elements of the first and second array comprises an indication of the LRU entry of the upper level TLB on which the storing of the incremented logical tag is performed.

According to one embodiment, the first array has predefined maximum number of elements that are determined based on the maximum number of concurrent table walks performed. This can provide a reliable architecture preventing the case where non-covered concurrent table walks (i.e. having no elements associated with in the arrays because there are not enough elements) write their results on the same tag as other table walks covered by the circuit.

According to one embodiment, storing the incremented logical tag and the obtained absolute memory address in the TLB is performed by reading the element of the second array that corresponds to the first table walk. For example, the element of the second array associated with the first table walk may be read in order to read the value of the incremented logical tag.

According to one embodiment, the first table walk starts before the second table walk.

According to one embodiment, the TLB has a set associative structure, wherein the upper level TLB is a 4-way associative cache and the lower level TLB is a 6-way associative cache. This embodiment can be seamlessly integrated in existing systems.

According to one embodiment, the first and second table walks are performed in parallel.

According to one embodiment, the portion of bits comprises 8 bits.

Figure 1:
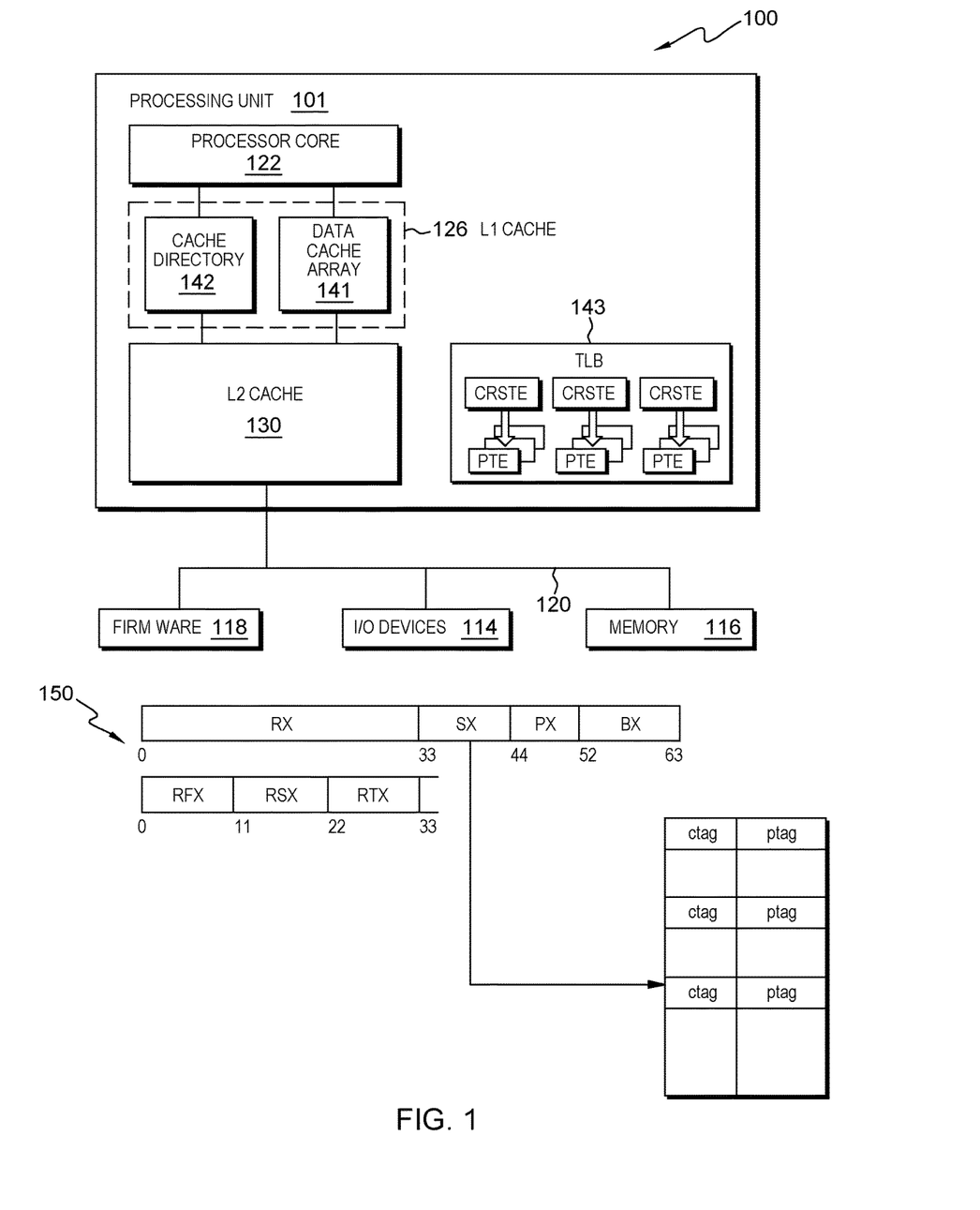
FIG. 1 illustrates a computer system in accordance with an example of the present disclosure.

FIG. 1 illustrates a computer system 100 in accordance with an example of the present disclosure. The computer system 100 can be based on the z/Architecture, offered by International Business Machines (IBM). Computer system 100 can use a set-associative cache memory structure. Computer system 100 comprises at least one processing unit 101. The processing unit 101 can be connected to various peripheral devices, including input/output (I/O) devices 104 (such as a display monitor, keyboard, and permanent storage device), memory device 106 (such as random-access memory or RAM) that is used by the processing units to carry out program instructions, and firmware 108 whose primary purpose is to load an operating system from one of the peripherals whenever the computer is turned on. Processing unit 101 communicates with the peripheral devices (e.g. firmware 118, I/O devices 114 and memory 116) by various means, including a generalized interconnect or bus 120.

Processing unit 101 includes a processor core 122 having a plurality of registers and execution units, which carry out program instructions in order to operate the computer. An exemplary processing unit includes the PowerPC™ processor marketed by International Business Machines Corporation. The processing unit 101 also can have one or more caches. For example, the processing unit 101 is shown as comprising two caches 126 and 130. Caches are used to temporarily store values that might be repeatedly accessed by a processor, in order to speed up processing by avoiding the longer step of loading the values from memory 116.

Caches 126 and 130 are set-associative caches which enable processor to achieve a relatively fast access time to a subset of data or instructions previously transferred from a memory 116.

The caches 126 and 130 can be integrally packaged with the processor core 122. The cache 126 can comprise instruction arrays (not shown) and data arrays 141 which are implemented using high-speed memory devices. Instructions and data may be directed to the respective cache by examining a signal that is indicative of whether the processor core is requesting an operation whose operand is instruction versus data. The cache 126 can further comprise a cache directory 142 associated with the data array 141. For example, each cache line in the data array 141 has a corresponding entry in cache directory 142. The cache directory 142 can indicate whether the data identified by an effective address 150 is stored in the data array 141. For example, a processor instruction that references an effective address can be provided to the cache 126. If the effective address is in the cache directory 142, then the processor knows it can get the referenced data from the data array 141 subject to access criteria being fulfilled, wherein access criteria may require that the valid bit is set etc.

The data array 141 and the cache directory 142 can be constructed from conventional memory arrays, such as are readily available in configurations of, for example, 4 megabyte or 8 megabyte chip arrays. The cache 126 is associated with a cache controller (not shown) that for example manages the transfer of data between the processor core 122 and the caches.

For example, data cache array 141 can have many cache lines which individually store the various data values. The cache lines are divided into groups of cache lines called "sets." An exemplary cache line includes a state-bit field, an exclusivity-bit field, and a value field for storing the actual instruction or data. The state-bit field and inclusivity-bit fields are used to maintain cache coherency in a multiprocessor computer system. The address tag is a subset of the full address of the corresponding memory block. A compare match of an incoming effective address with one of the tags within the address-tag field indicates a cache "hit." The collection of all of the address tags in a cache (and sometimes the state-bit and inclusivity-bit fields) is referred to as a directory, and the collection of all of the value fields is the cache entry array.

The cache 126 can be referred to as level 1 (L1) cache and cache 130, can be referred to as a level 2 (L2) cache since it supports the (L1) cache 126. For example, cache 130 can act as an intermediary between memory 116 and the L1 cache, and can store a larger amount of information (instructions and data) than the L1 cache can, but at a longer access penalty. For example, cache 130 can have a storage capacity of 256 or 512 kilobytes, while the L1 cache can have 64 kilobytes of total storage. Cache 130 is connected to bus 120, and all loading of information from memory 116 into processor core 122 can come through cache 130. Although FIG. 1 depicts only a two-level cache hierarchy, multi-level cache hierarchies can be provided where there are many levels of serially connected caches. For example, the components of processing unit 101 can be packaged on a single integrated chip.

The processing unit 101 can further comprise a DAT unit (not shown) in charge of translating virtual addresses into real or absolute addresses. This task is accomplished through the access of memory 116 tables managed by an operating system e.g. z/OS. Depending on the addressing type, the memory 116 can comprise different translation table levels. For example, with 64-bit addressing it is possible to have up to five tables involved in such translation (third region, second region, first region, segment, and page tables). After going through a translation using such translation tables in the memory 116, DAT keeps the relation page/frame in a TLB entry e.g. of TLB 143. Then, for the next translation before going through a table translation in the memory, DAT first inspects TLBs looking for the needed page. In case of a hit, the translation process is much faster.

Also shown in FIG. 1 is TLB 143 for translating an effective address (also referred to as logical or virtual address) to a corresponding absolute address. Specifically, TLB 143 can translate the page number portion of an effective address to a corresponding real page number. For example, the tag field of effective address can be sent to TLB 143 to be translated to a corresponding real page number.

The TLB 143 structure shown in FIG. 1 is for the 64 bit addressing example. For example, the TLB comprises an upper level TLB which comprises combined region- and segment-table entries (CRSTE), wherein each entry contains the page-table origin (PTO), which is the translation results of all region- and segment-table entries. The lower level TLB comprises page-table entries (PTE), wherein each entry stores the recently used page table entry.

The virtual address 150, accordingly, is divided into four principal fields. Bits 0-32 are called the region index (RX), bits 33-43 are called the segment index (SX), bits 44-51 are called the page index (PX), and bits 52-63 are called the byte index (BX). The RX part of the virtual address is itself divided into three fields. Bits 0-10 are called the region first index (RFX), bits 11-21 are called the region second index (RSX) and bits 22-32 are called the region third index (RTX).

As indicated in FIG. 1, for exemplification purpose, the access to an entry of the upper level TLB can be performed using the segment index SX. In addition to SX, a tag can be used. As shown in FIG. 1, this tag is referred to as "ctag." The ctag is obtained from a higher level TLB (e.g., a third region TLB), while SX is obtained from the virtual address, wherein the higher level TLB can be accessed using the RX portion. The identified entry further comprises another tag "ptag," that is used in addition to the page index PX in order to identify the requested entry in the lower level TLB.

Figure 2:
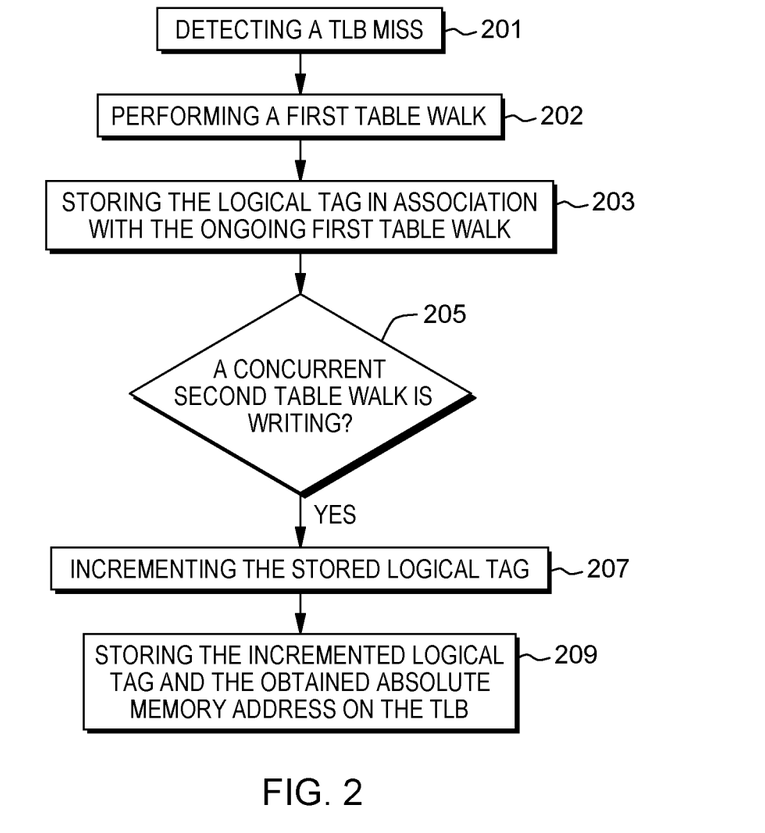
FIG. 2 is a flowchart of a method for operating a hierarchical translation lookaside buffer.

FIG. 2 is a flowchart of a method for operating a hierarchical translation lookaside buffer 143. In this example of FIG. 2, the hierarchical translation lookaside buffer 143 can comprise only two level TLBs. Thus, the entry of the higher level TLB may comprise a portion of bits (e.g., bits 2:10) which comprises only one tag (e.g., ptag) for indicating the related entries in the lower level TLB (e.g., ctag is not required).

In step 201, a TLB miss can be detected or encountered for a requested first virtual address. For example, the first virtual address can be received for accessing a given entry and in response to looking for the requested first virtual address in the TLB 143, a TLB miss can be detected. The first virtual address can for example have a structure as the address 150 described with reference to FIG. 1. The TLB miss can be a full TLB miss where none of the level TLBs finds a hit for the requested first virtual address. While looking up or accessing the TLB 143, a ptag can also be read from the upper level TLB (e.g., CRSTE) when the upper level TLB is scanned for SX indicated by the first virtual address. The read ptag can be the tag of an entry (e.g., LRU entry) to be replaced or deleted in order to store the results of the first table walk. The read ptag (e.g., bits 2:10 of the LRU entry) can be referred to as "logical tag." LRUs value can also be read during the same access to the TLB 143, wherein the LRU values indicate which entries of the upper and lower level TLBs the result of the induced table walk can be written.

In response to detecting the TLB miss, a first table walk can be performed in step 202 in order to obtain the absolute memory address for the first virtual address e.g., from translation tables of the memory 116. This results in the first table walk being running or ongoing.

In step 203, the logical tag can be stored in association with the ongoing first table walk. For example, the structure of FIG. 3 can be used to store the logical tag in association with the ongoing first table walk.

It can be determined (inquiry 205) if a second table walk which is concurrent to the ongoing first table walk and that has a second virtual address that addresses the same entry in the upper level TLB CRSTE as the first virtual address is writing in the TLB. The second table walk is concurrent to the first table walk as it is a running table walk at the time of performing inquiry 205. The second table walk is triggered by a TLB miss (full TLB miss) of the second virtual address.

In response to determining that the second table walk has a second virtual address that addresses the same entry in the upper level TLB CRSTE, is writing in the TLB, the stored logical tag can be incremented in step 207. In this way, the ongoing first table walk is associated with the incremented logical tag (e.g., the logical tag becomes ptag+1).

In step 209, the incremented logical tag and the obtained absolute memory address can be stored on the TLB in the determined LRU entries. For example, upon the first table walk obtaining the absolute memory address, the tag stored in association with the first table walk is read, e.g., from the structure of FIG. 3 and the LRU values are also read in order to identify where to store the absolute memory address and the read tag. In one example, the read tag that stored in association with the first table walk may be further incremented before being stored in the TLB.

For example, each of the first and second table walks is configured, before writing in the TLB, to increment the logical tag of the entry to be replaced (e.g., the one that has been determined in step 201). In other words, the first table walk can increment the logical tag twice, once in step 207 and once in step 209. In this way a TLB write mismatch can be avoided.

Figure 3:
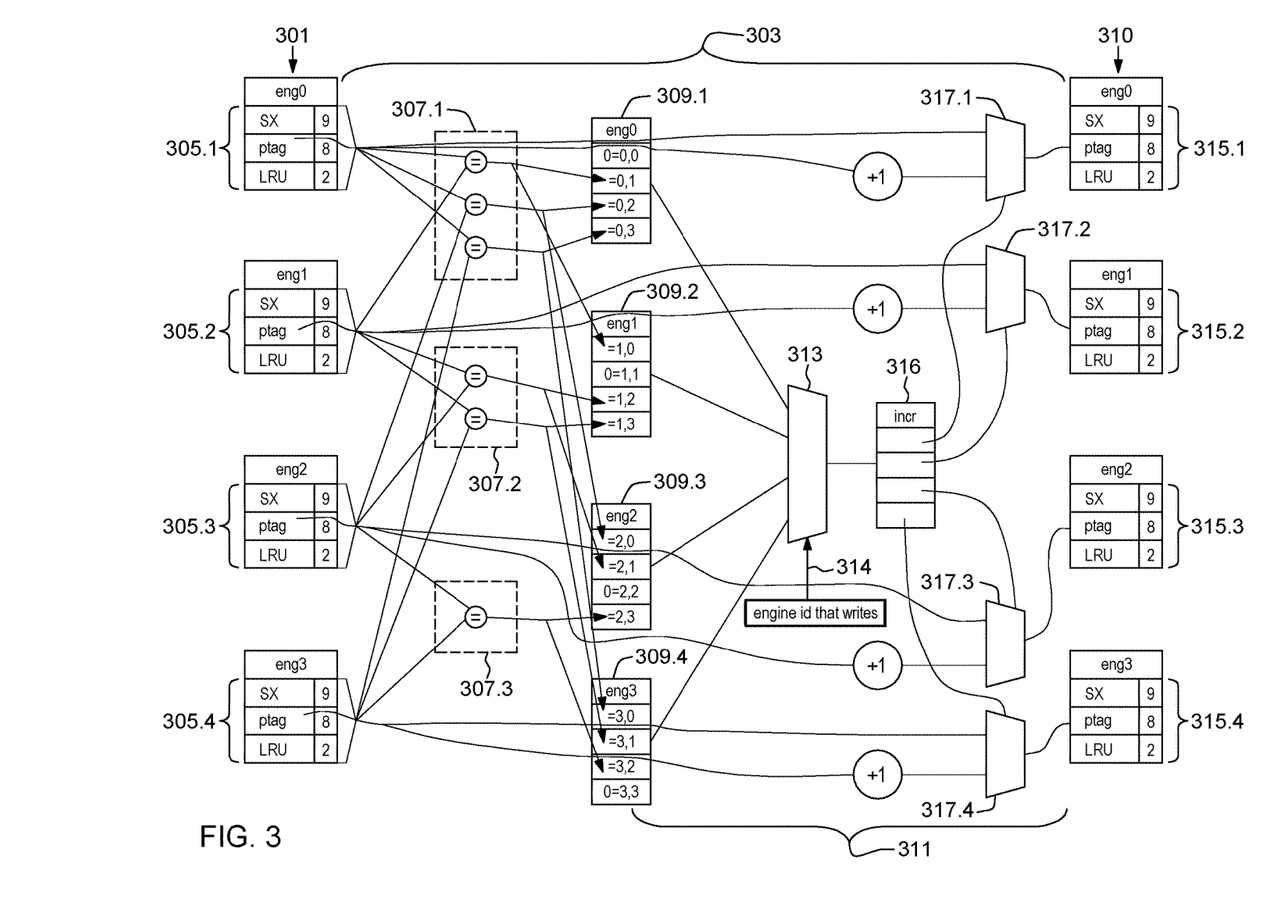
FIG. 3 is a block diagram a of data structure of a processing unit of the computer system in accordance with the present disclosure.

FIG. 3 is block diagram of the hardware structure in accordance with the present disclosure.

FIG. 3 shows two arrays, a first array 301 and a second array 310. The first array 301 comprises elements 305.1-4 each associated with an ongoing table walk referred to as eng0-3. Eng0-3 refers to engines that perform the respective table walks. In this example, only four ongoing table walks are described. However, more or less table walks can be supported by the present disclosure. The order in which engines are assigned to the table walks can be arbitrary. For example, eng0 is doing the first table walk, eng1 doing the 2nd and eng3 doing the 3rd is possible, but all other permutations would work just as well.

As described above, a table walk is triggered by a requested virtual address for which a TLB miss has been encountered in the TLB 143. Also described above is that the TLB miss is accompanied by determining a logical tag ptag and the LRU entries in the lower and upper level TLBs to be replaced. Thus, a table walk can be described or associated with the virtual address, ptag and the LRU entries as described with reference to FIG. 2.

The second array 310 comprises elements 315.1-4 each associated with the ongoing table walk referred to as eng0-3. The second array is shown only for illustration purpose but physically the second array 310 is the first array 301.

Each element of the first array comprises data indicative of the entry of the upper level TLB that is addressed by a virtual address (e.g., SX) of the table walk of the element and the LRU entries to be replaced.

For example, assuming that eng0 corresponds to the first table walk of FIG. 2. In this case, the element associated with first table walk comprises data indicative (e.g., SX) of the entry of the upper level TLB that is addressed by the first virtual address and the entries (e.g., LRU entries) where the results of the first table walk are to be stored. The element comprises the logical tag (ptag) of the LRU entry of the upper level TLB for the first table walk and the index SX of the first virtual address.

FIG. 3 further shows a circuit logic 303, that implements at least part of the method of FIG. 2, namely steps 205-209. For each element 305.1-3, the circuit logic 303 comprises a respective comparison logic 307.1-3. A comparison logic, e.g., 307.1, of a given element, e.g., 305.1, associated with a given table walk, e.g., eng0, is configured to compare the content of the respective element 305.1 with the content of the elements associated with other table walks. The comparison method is commutative in that it avoids repeated comparisons. This is why the last element 305.4 is not associated with a respective comparison logic because all comparisons are covered by the three comparison logics 307.1-3.

The output of the comparison logic 307.1-3 is used to maintain or increment the logical tag value in each of the elements 315.1-4 of the second array 310. For that, the circuit logic 303 comprises a register 309.1-4 per table walk eng0-3. For example, register 309.1 comprises the results of each comparison of the table walk eng0 with the other table walks eng1-3. Register 309.2 comprises the result of each comparison of the table walk eng1 with the other table walks eng0 and eng2-3. The output of the comparison logics 307.1-4 are connected to registers 309.1-4 as indicated in FIG. 3. For example, comparison logic 307.3 is only connected to the registers 309.3-4 because it only involves the comparison between table walks eng2 and eng3. The content of the registers 309.1-4 is used as input to a decision logic 311. For example, each register 309.1-4 provides a vector, elements of which indicate the result of comparison of the respective table walk with the other table walks.

The decision logic comprises a multiplexer 313 that receives the inputs from the registers 309.1-4 and a select signal 314 indicating the table walk that writes the result in the TLB. The select signal 314 is used to select one of the vectors input by the registers 309.1-4. The resulting vector is read to identify which table walks are interfering with the one which is writing. The result of the selection at the multiplexer 313 is input by the multiplexer 313 to a register 316 that comprises values indicating, for each table walk, whether the respective tag is to be incremented or not.

The outputs of the register 316 are provided as inputs to respective multiplexers 317.1-4 associated with the table walks eng0-3 for providing instruction of indication to the elements 315.1-4 whether the tag is to be incremented. Each multiplexer 317.1-4 receives the tag and incremented tag values of the respective table walk eng0-eng3 and uses the input from the register 316 to use one of the tags or incremented tags for the respective table walk eng0-3 in the second array 310.

For example, in one case a) eng1 writes, eng0 is still running Eng1 and eng0 both have the same SX and started with identical LRU and ptag. Eng1 writes a new CRSTE entry with an incremented ptag. Via the logic in FIG. 3 eng0 would also increment its ptag now. By the time eng0 writes it would increment again because it creates a new CRSTE entry. The entry that eng0 creates overwrites the CRSTE entry of eng1 and orphans the PTE entry of eng1. Those orphaned entries can eventually be scrubbed by a different logic.

In another case b) Eng1 writes, eng0 is still running Eng1 and eng0 have the same SX but different LRU or ptags. When eng1 writes a new CRSTE entry it increments the ptag but the ptag of other engines is not incremented.

In another case c) Eng1 writes, eng0 is still running. Eng1 started with a partial hit, no new CRSTE entry is created only a PTE entry is added. It re-uses the ptag it obtained at the beginning and no other ptag of other engines is incremented.

In one example, a method of operating a hierarchical TLB is provided, wherein intermediate translation results are stored in separate arrays, and wherein small logical tags representing the same logical memory address are used to link entries in the different arrays. The method performs the following steps when a TLB miss is encountered for a given logical memory address: storing the associated logical tag; performing a table walk to obtain the absolute memory address for the given logical memory address; in case of a concurrent TLB write access in the same congruence class of the ongoing table walk; and incrementing the stored logical tag.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A method of operating a hierarchical translation lookaside buffer (TLB) when a TLB miss is encountered for a requested first virtual address, the TLB comprising at least two TLB levels, wherein a given entry of the upper level TLB comprises a portion of bits for indicating related entries in the lower level TLB, the method comprising:
   performing a first table walk to obtain the absolute memory address of the first virtual address;
   storing in association with the first table walk, as a logical tag, the portion of bits of an entry to be replaced of the upper level TLB;
   responsive to determining that a second table walk, concurrent with the first table walk, having a second virtual address that addresses the same entry in the upper level TLB as the first virtual address is writing in the TLB, incrementing the stored logical tag; and
   storing the incremented logical tag and the obtained absolute memory address in the TLB.

2. The method of claim 1, further comprising:
   determining a least recently used (LRU) entry in the upper level TLB as the entry to be replaced and a LRU entry in the lower level TLB, wherein storing the logical tag further comprises storing an indication of the two LRUs in association with the first table walk.

3. The method of claim 2, wherein the LRU entry and the logical tag are determined during access of the TLB that results in detecting the TLB miss and before performing the first table walk.

4. The method of claim 1, further comprising:
   detecting a TLB miss for the second virtual address and storing the logical tag in association with the second table walk; and
   performing the second table walk, incrementing the stored logical tag of the second table walk such that the resulting tag is different from the incremented logical tag of the first virtual address and storing the incremented logical tag of the second table walk and the obtained absolute memory address of the second virtual address in the TLB.

5. The method of claim 1, further comprising:
   detecting a TLB miss for a third virtual address that addresses the same entry in the upper level TLB as the first virtual address;
   storing the logical tag in association with a third table walk;

wherein the increment of the logical tag of the first table walk further comprises incrementing the logical tag of the third table walk when the third table walk is concurrent with the second table walk; and wherein the storing of the incremented logical tag and the obtained absolute memory address in the TLB further comprises: in response to determining that the third table walk is concurrent with the first table walk at the time of the storing, incrementing the logical tag of the third table walk.

6. The method of claim 1, further comprising:

storing data indicative of the entry of the upper level TLB that is addressed by a virtual address of the table walk in a datastore wherein the data comprises at least the logical tag for the first table walk; and performing the determining and the incrementing step using the stored indicative data and storing the incremented tag, associated with the first table walk, in the datastore.

7. The method of claim 6, wherein the each element of the datastore comprises an indication of the LRU entry of the upper level TLB on which the storing of the incremented logical tag is to be performed.

8. The method of claim 6, wherein the datastore has a predefined maximum size based on the maximum number of concurrent table walks to be performed.

9. The method of claim 6, wherein the storing of the incremented logical tag and the obtained absolute memory address in the TLB is performed by reading the datastore that corresponds to the first table walk.

10. The method of claim 1, wherein the TLB has a set associative structure, wherein the upper level TLB is a 4-way associative cache and the lower level TLB is a 6-way associative cache.

11. The method of claim 1, wherein the first and second table walks are performed in parallel.

12. The method of claim 1, wherein the first virtual address comprises 64 bits and wherein the portion of bits comprises 8 bits.

* * * * *